(12) United States Patent
Bockstanz et al.

(10) Patent No.: US 9,890,693 B2
(45) Date of Patent: Feb. 13, 2018

(54) CHARGE AIR COOLER

(71) Applicants: DENSO International America, Inc., Southfield, MI (US); DENSO CORPORATION, Kariya, Aichi-pref. (JP)

(72) Inventors: Kevin Bockstanz, Westland, MI (US); Dwayne Robert Taylor, Livonia, MI (US)

(73) Assignees: DENSO International America Inc., Southfield, MI (US); DENSO CORPORATION, Kariya (JP)

( * ) Notice: Subject to any disclaimer, the term of this patent is extended or adjusted under 35 U.S.C. 154(b) by 85 days.

(21) Appl. No.: 15/082,593

(22) Filed: Mar. 28, 2016

(65) Prior Publication Data
US 2017/0276058 A1    Sep. 28, 2017

(51) Int. Cl.
| | |
|---|---|
| F02B 29/04 | (2006.01) |
| F02B 33/00 | (2006.01) |
| F26B 21/06 | (2006.01) |
| F26B 17/00 | (2006.01) |
| B01D 59/26 | (2006.01) |
| B01D 53/02 | (2006.01) |
| F28F 1/10 | (2006.01) |
| F28F 9/02 | (2006.01) |
| F26B 3/084 | (2006.01) |
| F26B 3/08 | (2006.01) |
| B01D 53/26 | (2006.01) |
| F28F 9/013 | (2006.01) |

(52) U.S. Cl.
CPC ...... *F02B 29/0468* (2013.01); *F02B 29/0475* (2013.01); *B01D 53/02* (2013.01); *B01D 53/261* (2013.01); *F26B 3/08* (2013.01); *F26B 3/084* (2013.01); *F28F 9/013* (2013.01); *F28F 9/0212* (2013.01); *Y02T 10/146* (2013.01)

(58) Field of Classification Search
CPC .............. F02B 29/0468; F02B 29/0475; F28D 1/05366; F28D 2021/0082; B01D 53/261; B01D 53/563; F28F 9/0234; F28F 17/005
USPC ............. 60/599; 123/563; 96/108, 126, 115; 34/80, 578, 588, 591; 165/172, 174, 110
See application file for complete search history.

(56) References Cited

U.S. PATENT DOCUMENTS

| | | | | |
|---|---|---|---|---|
| 1,939,694 | A * | 12/1933 | Hasche | C01B 17/60 95/106 |
| 2,038,071 | A * | 4/1936 | Wilhelm | B01D 46/0038 96/118 |
| 2,568,891 | A * | 9/1951 | Kals | B01D 47/06 34/73 |

(Continued)

FOREIGN PATENT DOCUMENTS

| | | | | |
|---|---|---|---|---|
| DE | 102008045685 A1 * | 9/2010 | .......... | F02B 29/0437 |
| EP | 2140926 A2 | 1/2010 | | |

(Continued)

*Primary Examiner* — Thai Ba Trieu

(57) ABSTRACT

A chamber for absorbing condensate formed in a charge-air-cooler of a turbocharged engine system. The chamber may include desiccant to absorb the moisture. The chamber may also include a valve that is controlled by the vehicle control module to open to allow airflow to pass by the desiccant and absorb the moisture from the desiccant or to place in a closed position to allow the desiccant to absorb the condensate formed in the charge-air-cooler.

20 Claims, 5 Drawing Sheets

(56) References Cited

U.S. PATENT DOCUMENTS

| | | | | |
|---|---|---|---|---|
| 3,296,773 | A * | 1/1967 | Hemstreet | B01D 8/00 96/146 |
| 4,374,655 | A * | 2/1983 | Grodzka | F24F 3/1411 96/112 |
| 4,786,301 | A * | 11/1988 | Rhodes | F24F 3/1411 96/144 |
| 5,771,707 | A * | 6/1998 | Lagace | F28D 19/042 165/8 |
| 6,167,956 | B1 * | 1/2001 | Bostedo | F04B 39/06 123/563 |
| 6,394,076 | B1 | 5/2002 | Hudelson | |
| 6,786,210 | B2 * | 9/2004 | Kennedy | F02B 29/0418 60/599 |
| 6,874,569 | B2 * | 4/2005 | Gawthrop | F25B 39/04 165/110 |
| 7,980,076 | B2 * | 7/2011 | Buia | F02B 29/0468 60/599 |
| 8,191,366 | B2 | 6/2012 | Taylor | |
| 8,726,889 | B2 | 5/2014 | Cockerill et al. | |
| 2002/0073730 | A1 * | 6/2002 | Shibata | F25B 39/04 62/509 |
| 2004/0244398 | A1 * | 12/2004 | Radermacher | E03B 3/28 62/285 |
| 2005/0204772 | A1 * | 9/2005 | Patel | F25B 39/04 62/509 |
| 2005/0268633 | A1 * | 12/2005 | Smith | B60H 1/3201 62/238.3 |
| 2008/0115528 | A1 * | 5/2008 | Yamamoto | B60H 1/3227 62/513 |
| 2010/0000247 | A1 * | 1/2010 | Bhatti | F24F 3/1417 62/235.1 |
| 2011/0094219 | A1 | 4/2011 | Palm | |
| 2013/0291536 | A1 | 11/2013 | Koch et al. | |
| 2013/0319226 | A1 * | 12/2013 | Becze | B01D 53/263 95/26 |
| 2015/0167539 | A1 * | 6/2015 | Basile | F02B 29/0468 60/599 |
| 2015/0285128 | A1 * | 10/2015 | Cardwell | F02B 29/0468 60/599 |
| 2015/0369119 | A1 | 12/2015 | Sharma et al. | |
| 2016/0040916 | A1 * | 2/2016 | Hanafusa | F25B 39/04 165/104.21 |
| 2016/0341107 | A1 * | 11/2016 | Dieterle | B01D 53/261 |
| 2017/0022886 | A1 * | 1/2017 | Dieterle | F02B 29/045 |

FOREIGN PATENT DOCUMENTS

| | | | |
|---|---|---|---|
| JP | 2011241797 A | * 12/2011 | |
| WO | WO 2008008571 A2 | * 1/2008 | F17D 3/14 |

\* cited by examiner

{CHARGE AIR COOLER

FIELD

This present disclosure relates to the field of automotive heat exchangers, more specifically this disclosure relates to a charge-air-cooler.

BACKGROUND

This section provides background information related to the present disclosure which is not necessarily prior art.

The present disclosure relates generally to turbocharger systems used with internal combustion engines in vehicles, and more particularly to charge-air-cooler assemblies used with turbocharger systems in vehicles.

Turbocharged and supercharged engines generally are configured to compress ambient air entering the engine in order to increase power. Because compression of the air may cause an increase in air temperature, a charge-air-cooler is commonly utilized to cool the heated air; the cooling increases the air density which further increases the potential power of the engine. If the humidity of the ambient air is high, however, condensation may form on internal surfaces of the charge-air-cooler that is cooler than the dew point of the compressed air. During transient conditions such as hard vehicle acceleration, these water droplets may be blown out of the charge-air-cooler and into the combustion chambers of the engine resulting in increased potential for engine misfire, loss of torque and engine speed, and incomplete combustion, for example. If the condensation ingestion into the engine intake is severe enough, the vehicle's engine control module may light the "service engine soon" light, which is very undesirable.

SUMMARY

This section provides a general summary of the disclosure, and is not a comprehensive disclosure of its full scope or all of its features.

A charge-air-cooler for a vehicle may comprise an inlet tank and an outlet tank. A core portion may fluidly join the inlet tank and the outlet tank. Also, a chamber may be below the core portion and additionally fluidly join the inlet tank and the outlet tank. A valve may be disposed between either; the inlet tank and the chamber or it may be disposed between the outlet tank and the chamber to fluidly disconnect the chamber from either the inlet tank or outlet tank. A desiccant cartridge may be disposed in the chamber.

An additional embodiment may be a charge air condensation system for a vehicle. The charge air condensation system may contain a charge air cooler with an inlet end tank with an inlet to allow charge air to enter. Also an outlet end tank with an outlet to allow charge air to exit the charge air cooler. A plurality of tubes may fluidly couple the inlet end tank and the outlet end tank. A chamber may be disposed below the plurality of tubes, desiccant may be contained in the chamber. An inlet conduit may fluidly couple the chamber and the inlet end tank. An outlet conduit may fluidly couple the chamber and the outlet end tank. Also a valve may be disposed in the outlet conduit to fluidly decouple the chamber from the outlet end tank.

An additional embodiment may be a vehicle with a turbo charged system. The system may have an engine and a turbocharger having a compressor providing charge air. A charge air cooler may be connected to the compressor and configured to receive the charged air. The charge air cooler may have an inlet tank and an outlet tank. The charge air cooler may also have a core portion that fluidly couples the inlet tank and outlet tank. Additionally the charge air cooler may comprise a chamber that contains desiccant; the chamber may be below the core portion and fluidly couples the inlet tank and outlet tank. Also, the charge air cooler may have a valve that can open and close and can decouple the chamber from either the inlet tank or the outlet tank. A vehicle control module may be connected to the valve to control whether the valve is opened or closed.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
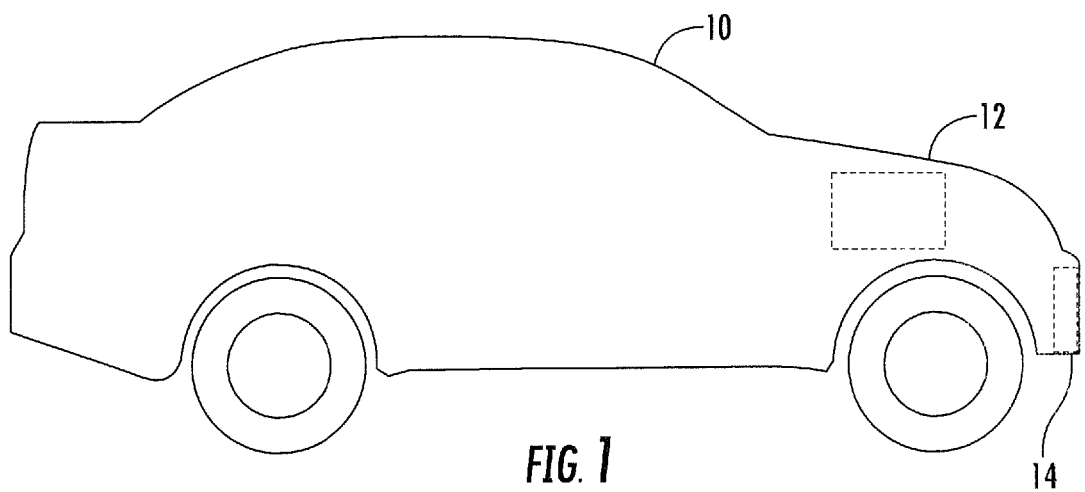
FIG. 1 is a schematic representation of a vehicle having a turbocharged engine system.

Example embodiments will now be described more fully with reference to the accompanying drawings. The following description is merely exemplary in nature and is not intended to limit the present disclosure, application, or uses. It should be understood that throughout the drawings, corresponding reference numerals indicate like or corresponding parts and features.

Figure 2:
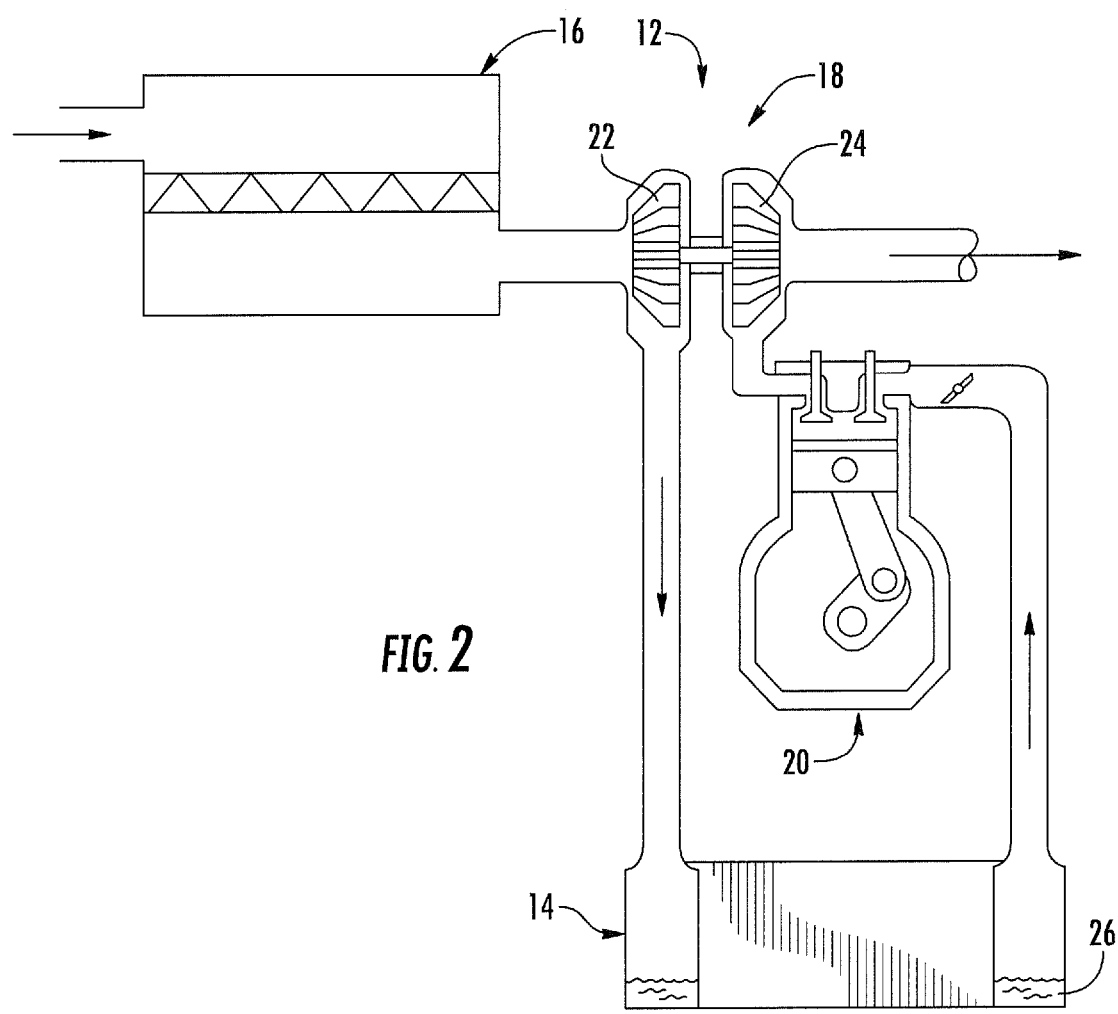
FIG. 2 is a representation of turbocharged engine system.

FIG. 1 depicts a vehicle 10 with a turbocharged engine system 12, within that system consists a charge-air-cooler (CAC) 14 or also known in the art as an intercooler. Referring now to FIG. 2, a typical turbocharged engine system 12 is depicted. The turbocharged engine system 12 includes an air intake filter housing 16, a turbocharger 18, a CAC 14, and an engine 20. The turbocharger 18 includes a compressor 22 for supplying combustion air to an air intake of the engine 20 and a turbine 24 connected to the compressor 22 with a shaft. The turbine 24 receives exhaust gases from the engine 20 and drives the compressor 22, which compresses the intake air. The CAC 14 receives the compressed air from the compressor 22 of the turbocharger 18 and cools the air as it passes there through. Condensate 26 may collect in the CAC 14 and may be drawn into the engine 20, which is undesirable, because condensate from the CAC 14 may foul combustion of the engine 20.

Figure 3:
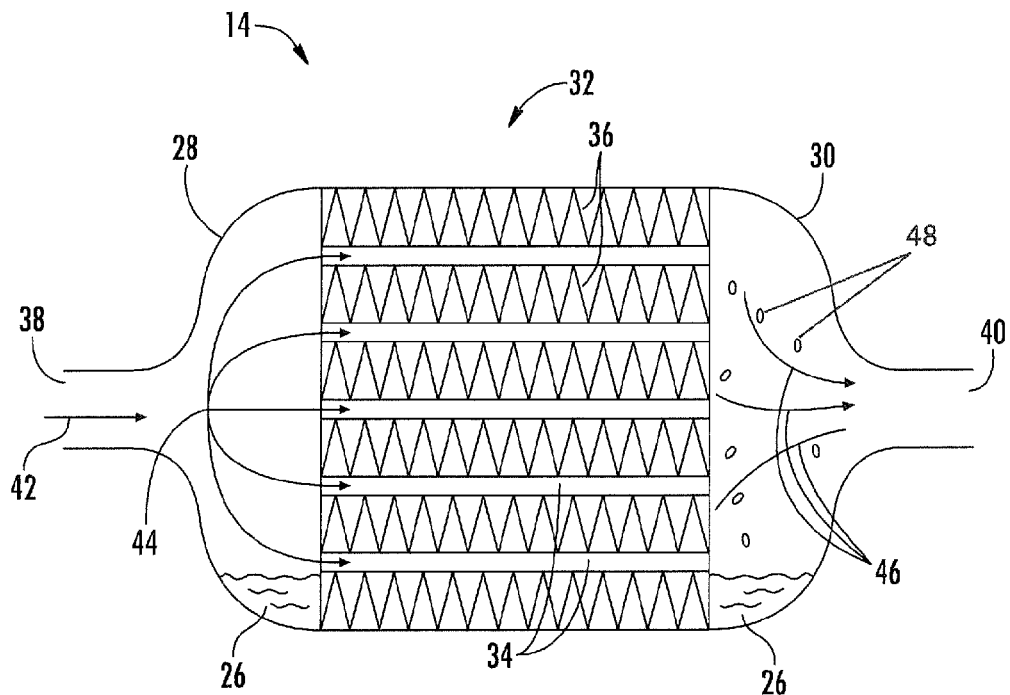
FIG. 3 is a representation of a charge-air-cooler.

With reference to FIG. 3, an isolated view of a CAC 14 that may be used on a typical vehicle 10 is shown. The CAC 14 has an inlet end tank 28 and outlet end tank 30, also} known in the art as end tanks or inlet tank and outlet tank respectively. A core section 32 is disposed in-between and connects the inlet end tank 28 to the outlet end tank 30. The core section includes plurality of tubes 34, in-between the tubes is a series of fins 36. The inlet end tank 28 contains an inlet 38; the outlet end tank 30 has an outlet 40. The typical function of the CAC 14 is the warm compressed charge air will flow into inlet 38 represented by arrow 42. The charge air may fill the inlet end tank 28 and flow through the plurality of tubes 34 represented by arrows 44. The cooled charge air exits the tubes 34 in the outlet tank 30, and out the outlet 40, the flow represented by arrows 46. As previously stated, condensation 26 may be formed on any internal surface of the charge-air-cooler that is cooler than the dew point of the compressed air. The condensation droplets 48 may travel into the engine 20 with the airflow 46 and may cause damage, additionally condensate 26 may accumulate in both tanks 28, 30.

Figure 4:
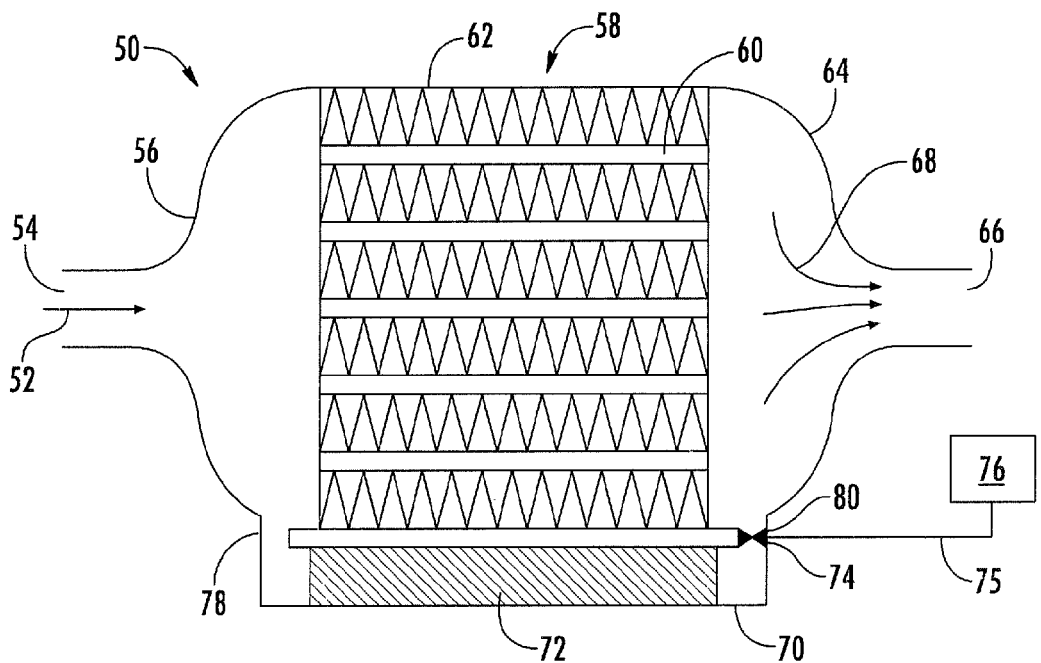
FIG. 4 is an isolated view of a charge-air-cooler.

The current embodiment is depicted in FIG. 4, which is an isolated view of CAC assembly 50. The CAC 50 may generally operate the same as a standard CAC 14. The charged air represented by arrow 52 enters the inlet 54 of the inlet end tank 56. The charged air passes through the core section 58, the core section 58 may contain a series of tubes 60 for the charged air to pass through, in between the tubes 60 may be a plurality of fins 62. The cooled charged air 68 exits the tubes 60 into the outlet end tank 64 and out the outlet 66. As previously stated condensate may form on the internal components of the CAC 50. A chamber 70 may fluidly connect the inlet end tank 56 and outlet end tank 64. A desiccant pouch or cartridge or bundle, simply referred to as desiccant 72 is located in chamber 70. A valve 74 may be placed at the connection of the chamber 70 and outlet end tank 64. The valve 74 is connected to a vehicle control module 76 via wire harness 75 and the valve 74 is in electronic communication with the vehicle control module 76 through wire harness 75. As shown in FIG. 4 the chamber 70 may be located below the CAC 50 core section 58 and connected to the inlet end tank 56 via a first conduit or inlet pipe 78. A second conduit or outlet pipe 80 may connect the chamber 70 to the outlet end tank 64. Valve 74 may be disposed within the outlet pipe 80. In the present embodiment; rather condensate collecting at the bottom of the tanks, as shown in FIG. 2 and FIG. 3, the condensate will collect in chamber 70 and be absorbed by the desiccant 72. Desiccant is generally used in many applications to act as a drying agent. In the automotive field it is commonly used in air conditioning systems incorporated in a receiver/dryer or in an accumulator. In this type of application there is very little moisture in the air conditioning system for the desiccant to absorb; desiccant may be used for the life of the system. However, a turbocharged engine system 12 and CAC 50 may see a significant amount of moisture/condensate on humid days. It may be possible to fully saturate the desiccant 72 in a period of time. The valve 74 can open and close or partially open and close and is controlled by the vehicle control module 76. The valve 74 may be use to purge the system periodically as the vehicle 10 is driving. As previously stated, during transient conditions like a hard acceleration it is imperative to keep a large amount of condensation out of the engine 20. However, during a steady state driving condition like driving on an expressway at a constant speed, smaller amounts of moisture can be fed from the CAC 50 to the engine 20. This is accomplished by the vehicle control module 76 recognizing the vehicle 10 is in a steady state driving condition and opening up valve 74. This would allow airflow 52 to flow through chamber 70 and desiccant 72. The airflow 52 would dry or absorb some moisture from the desiccant 72 and deliver it to the engine 20, purging or recharging the desiccant 72. This would allow for significant amount uses of the desiccant 72 and maintain a low serviceability for CAC 50 while preventing a large devastating amount of condensate 26 from entering engine 20.

Figure 5:
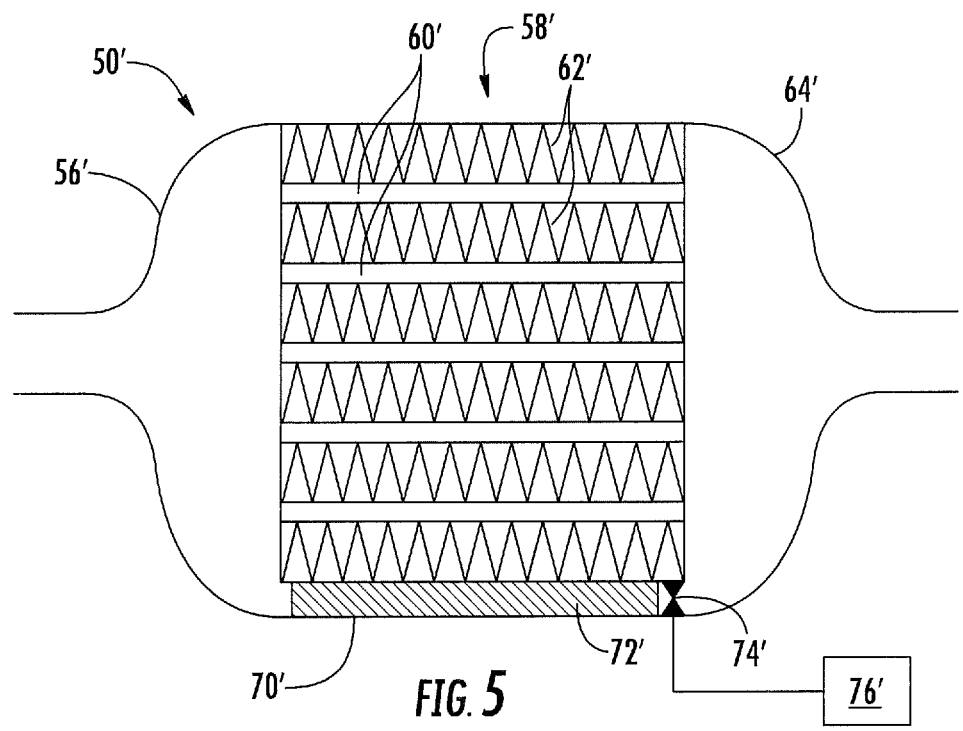
FIG. 5 is an isolated view of an additional embodiment charge-air-cooler.

FIG. 5 depicts a different embodiment of the present disclosure, CAC 50' is shown with a tube chamber 70' not being outside the core portion 58' but rather as an enlarged tube, similar to tubes 60' that make up the core section 58' along with fins 62'. The tube chamber 70' may contact the fins 62' and offer further heat transfer capabilities. The tube chamber 70' fluidly connects the inlet end tank 56' and outlet end tank 64'. The desiccant 72' is located in the tube chamber 70'. A valve 74' is located at the end of the tube chamber 70' that connects to the outlet end tank 64', wherein the valve 74' is connected to and controlled by vehicle control module 76'. The valve 74' functions as previously described.

Figure 6:
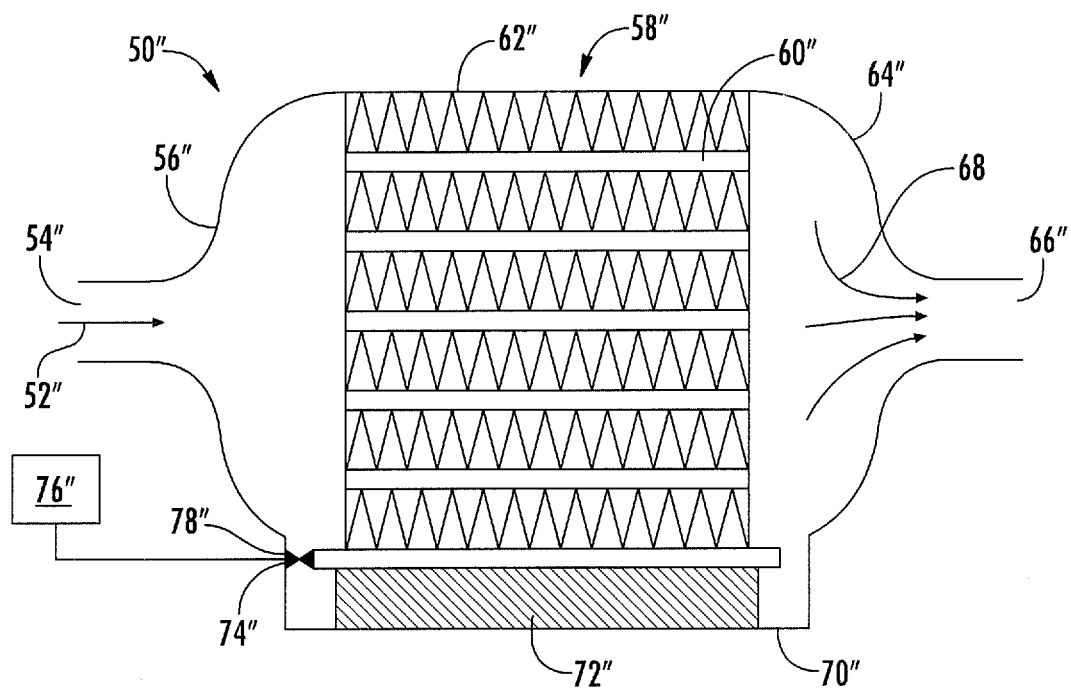
FIG. 6 is an isolated view of an additional embodiment charge-air-cooler.

FIG. 6. depicts a different embodiment of the present disclosure, CAC 50" is shown with a chamber 70" similar to the embodiment in FIG. 4, and reference numbers with double prime symbol (") referring the same or equivalent parts. However, the valve 74" is located on the conduit 78", which connects the inlet end tank 56" to the chamber 70". This configuration allows condensate that accumulates in the outlet end tank 64" to flow into chamber 70" and be absorbed by the desiccant 72". When the vehicle 10 is in a steady state driving condition, the valve 74" can be opened to purge the moisture from the desiccant 72".

Figure 7:
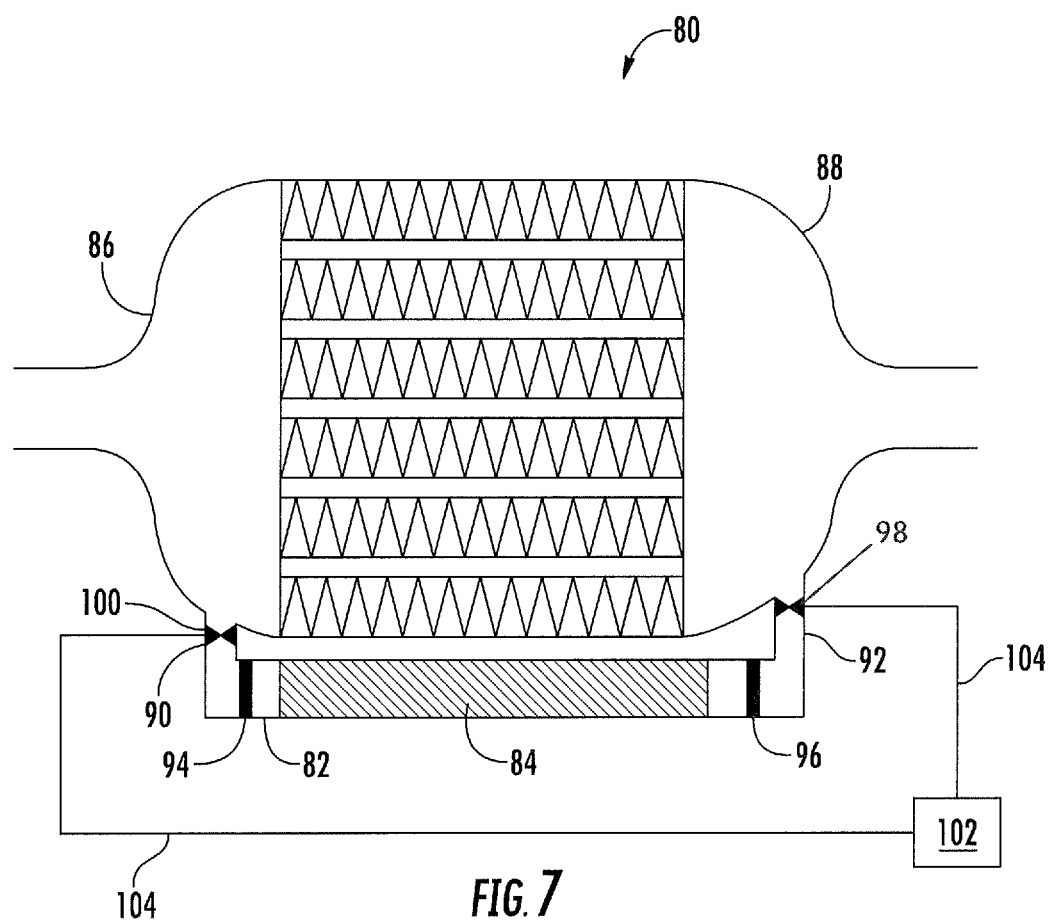
FIG. 7 is an isolated view of an additional embodiment charge-air-cooler.

FIG. 7 depicts yet another embodiment of CAC 80 and chamber 82 that houses desiccant 84. The chamber 82 is removable from the CAC 80 for serviceability. The CAC 80 inlet tank 86 and outlet tank 88 are in fluid communication with the chamber 82 by a first conduit 90 or inlet conduit and a second conduit 92 or outlet conduit. A first detachable joint 94 couples the chamber 82 to the inlet conduit 90 and a second detachable joint 96 couples the chamber 82 to the outlet conduit 92. The detachable joints 94, 96 may be fastened to the CAC by any suitable fastener in the art, whether by nut and bolt, or snap fit, or clip attachment by non-limiting example. The chamber 82 may be detachable to allow new desiccant 84 to be replaced in the CAC 80 at a periodic service interval. A first valve 98 may be placed in the outlet conduit 92, or second a valve 100 may be placed in the inlet conduit 90, or the CAC 80 may utilize valves 98, 100 in both conduits 90, 92 simultaneously. Both valves 98, 100 may be connected to a vehicle control module 102 by a wire harness 104.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, the specification and the following claims.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A charge-air-cooler for a vehicle comprising:
an inlet tank;
an outlet tank;
a core portion fluidly joining the inlet tank and the outlet tank;
a chamber below the core portion fluidly joining the inlet tank and the outlet tank;
a valve disposed between either the inlet tank and the chamber or the outlet tank and the chamber to fluidly disconnect the chamber from either the inlet tank or outlet tank; and
a desiccant cartridge disposed in the chamber.

2. The charge-air-cooler for a vehicle according to claim 1, wherein the core portion comprises a plurality of tubes that fluidly connect the inlet tank and outlet tank and a plurality of fins that are disposed between the tubes.

3. The charge-air-cooler for a vehicle according to claim 2, wherein the chamber is a tube chamber and joined with the core portion by the plurality of fins.

4. The charge-air-cooler for a vehicle according to claim 1, wherein the chamber is in fluid communication with the inlet tank through an inlet conduit and in fluid communication with the outlet tank through an outlet conduit.

5. The charge-air-cooler for a vehicle according to claim 4, wherein the valve is disposed in the inlet conduit.

6. The charge-air-cooler for a vehicle according to claim 4, wherein the valve is disposed in the outlet conduit.

7. The charge-air-cooler for a vehicle according to claim 4, further comprising a first detachable joint to separate the chamber from the inlet conduit; and
a second detachable joint to separate the chamber from the outlet conduit.

8. The charge-air-cooler for a vehicle according to claim 1, wherein the valve is in electronic communication with a vehicle control module, the vehicle control module determines open or closed position of the valve.

9. A charge air condensation system for a vehicle comprising:
an inlet end tank with an inlet to allow charge air to enter;
an outlet end tank with an outlet to allow charge air to exit;
a plurality of tubes fluidly coupling the inlet end tank and the outlet end tank;
a chamber disposed below the plurality of tubes; wherein the chamber contains desiccant;
an inlet conduit fluidly coupling the chamber and the inlet end tank;
an outlet conduit fluidly coupling the chamber and the outlet end tank; and
a valve disposed in the outlet conduit to fluidly decouple the chamber from the outlet end tank.

10. The charge air condensation system for a vehicle according to claim 9, further comprising a first detachable joint to separate the chamber from the inlet conduit; and
a second detachable joint to separate the chamber from the outlet conduit.

11. The charge air condensation system for a vehicle according to claim 9, wherein the valve is in electronic communication with a vehicle control module through a wire harness, the vehicle control module determines open or closed position of the valve.

12. The charge air condensation system for a vehicle according to claim 9, wherein the valve is a first valve; and
a second valve is disposed in the inlet conduit to fluidly decouple the inlet conduit from the chamber.

13. The charge air condensation system for a vehicle according to claim 12, wherein the first and second valve are in electronic communication with a vehicle control module through a wire harness, the vehicle control module determines open or closed position of the first and second valves.

14. A vehicle with a turbo charged system comprising:
an engine;
a turbocharger having a compressor providing charge air;
a charge air cooler connected to the compressor and receiving the charge air,
wherein the charge air cooler has an inlet tank an outlet tank a core portion that fluidly couples the inlet tank and outlet tank, a chamber that contains desiccant that is below the core portion and fluidly couples the inlet tank and outlet tank;
a valve decoupling the chamber from either the inlet tank or the outlet tank; and
a vehicle control module connected to the valve to control whether the valve is opened or closed.

15. The vehicle with a turbo charged system according to claim 14, wherein the core portion comprises a plurality of tubes that fluidly connect the inlet tank and outlet tank and a plurality of fins that are disposed between the tubes.

16. The vehicle with a turbo charged system according to claim 15, wherein the chamber is a tube chamber and joined with the core portion by the plurality of fins.

17. The vehicle with a turbo charged system according to claim 14, wherein the chamber is in fluid communication with the inlet tank through an inlet conduit and in fluid communication with the outlet tank through an outlet conduit.

18. The vehicle with a turbo charged system according to claim 17, further comprising a first detachable joint to separate the chamber from the inlet conduit; and
a second detachable joint to separate the chamber from the outlet conduit.

19. The vehicle with a turbo charged system according to claim 17, wherein the valve is located in the outlet conduit.

20. The vehicle with a turbo charged system according to claim 17, wherein the valve is a first valve; and
a second valve is disposed in the inlet conduit to fluidly decouple the inlet conduit from the chamber.

* * * * *